(12) United States Patent
Jain et al.

(10) Patent No.: US 9,890,313 B2
(45) Date of Patent: Feb. 13, 2018

(54) TREATED FIBER REINFORCED FORM STABLE PHASE CHANGE

(71) Applicant: Samit Jain, New Delhi (IN)

(72) Inventors: Devendra Jain, New Delhi (IN); Anil Kumar Mehta, Faridabad (IN); Suman Kumari, Guwahati (IN); Nidhi Agarwal, Ghaziabad (IN)

(*) Notice: Subject to any disclaimer, the term of this patent is extended or adjusted under 35 U.S.C. 154(b) by 68 days.

(21) Appl. No.: 14/438,627

(22) PCT Filed: Oct. 31, 2013

(86) PCT No.: PCT/IB2013/002421
§ 371 (c)(1),
(2) Date: Apr. 26, 2015

(87) PCT Pub. No.: WO2014/064518
PCT Pub. Date: May 1, 2014

(65) Prior Publication Data
US 2015/0247080 A1    Sep. 3, 2015

(30) Foreign Application Priority Data

Oct. 26, 2012  (IN) .......................... 3306/DEL/2012

(51) Int. Cl.
*C09K 3/18* (2006.01)
*C09K 5/00* (2006.01)
(Continued)

(52) U.S. Cl.
CPC .............. *C09K 5/063* (2013.01); *C08K 3/00* (2013.01); *C08K 9/00* (2013.01)

(58) Field of Classification Search
CPC ...... C08K 3/0033; C08K 3/0075; C08K 3/02; C08K 3/04; C08K 3/00; C08K 3/08;
(Continued)

(56) References Cited

U.S. PATENT DOCUMENTS 4,524,160 A * 6/1985 Maeda .................. C08K 9/04
523/200
4,572,864 A   2/1986 David
(Continued)

FOREIGN PATENT DOCUMENTS

CN    102659377 A    9/2012
EP    2491090 A1     8/2012

OTHER PUBLICATIONS

"Adhesion of Graphite Fibers to Epoxy Matrices: The Role of Fiber Surface Treatment" (Drzal, Lawrence T. et al.), The Journal of Adhesion, vol. 16, Issue 1, 1983, Dec. 13, 2006, pp. 1-30, Abstract.
(Continued)

*Primary Examiner* — Jane L Stanley
(74) *Attorney, Agent, or Firm* — Helix Patent Services LLC

(57) ABSTRACT

The present invention relates to a Reinforced Form Stable Phase Change Material (RFSPCM) and product thereof. Reinforcement with chemically treated fibers, of polymer in Phase Change Material (PCM) matrix gives a uniform blend of a stable form. This Reinforced Form Stable Phase Change Material (RFSPCM) according to present invention is non-toxic in nature, flexible, has high latent heat and high tensile or tearing strength both above and below the melting point of Phase Change Material (PCM). Further, the composition is so stable that it can easily be heated and cooled without leaking out its Phase Change Material (PCM). The present invention provides a simple Phase Change Material (PCM) product for user for providing stored heat that has improved safety and handling ability.

11 Claims, 3 Drawing Sheets

(51) Int. Cl.
*C09K 5/06* (2006.01)
*C08K 3/00* (2006.01)
*C08K 9/00* (2006.01)

(58) Field of Classification Search
CPC ... C08K 3/40; C08K 5/00; C08K 7/02; C08K 9/00; C08K 9/02; C08K 9/04; C08K 13/00; C08K 224/001
USPC .................................................... 252/70, 71
See application file for complete search history.

(56) References Cited

U.S. PATENT DOCUMENTS

| | | | | |
|---|---|---|---|---|
| 5,059,637 | A * | 10/1991 | Langer | C09D 5/18 521/100 |
| 5,124,010 | A * | 6/1992 | Nakao | D01F 11/16 205/768 |
| 5,718,835 | A * | 2/1998 | Momose | C09K 5/063 106/271 |
| 5,722,482 | A | 3/1998 | Buckly | |
| 5,885,475 | A * | 3/1999 | Salyer | C09K 5/063 165/10 |
| 5,989,334 | A * | 11/1999 | Dry | A61L 27/48 106/677 |
| 8,333,903 | B2 * | 12/2012 | Rolland | B32B 15/06 252/70 |
| 2003/0153667 | A1 * | 8/2003 | Jayaraman | C08K 3/08 524/432 |
| 2004/0116571 | A1 * | 6/2004 | Su | C08K 3/22 524/404 |
| 2005/0228097 | A1 * | 10/2005 | Zhong | B82Y 30/00 524/430 |
| 2007/0142540 | A1 * | 6/2007 | Chiou | C08K 7/06 524/495 |

OTHER PUBLICATIONS

"Pre-treatment of natural fibers and their application as reinforcing material in polymer composites", (Kalia, Susheel et al), Polymer Engineering & Science, vol. 49, Issue 7, DOI:10.1002/pen.21328, Jul. 2009, pp. 1253-1272; Abstract.

"Form-stable paraffin/high density polyethylene composites as solid-liquid phase change material for thermal energy storage: preparation and thermal properties" (Sari, Ahmet), Energy Conversion and Management, vol. 45, Issues 13-14, Aug. 2004, pp. 2033-2042, Abstract.

* cited by examiner

TREATED FIBER REINFORCED FORM STABLE PHASE CHANGE

FIELD OF THE INVENTION

The present invention relates to a new form of Reinforced Form Stable Phase Change Material (RFSPCM) and product thereof for thermal management.

BACKGROUND

Phase Change Material (PCM) is suitable for storing thermal energy in the form of latent heat. This latent heat can be utilized for heating and cooling application without changing its form. A Phase Change Material (PCM) is a substance with a high heat of fusion which melts and solidifies at a certain temperature and is also capable of storing and releasing of energy. The Phase Change Material (PCM) changes from solid to liquid and vice versa when heat is absorbed or released by it.

U.S. Pat. No. 6,217,993 discloses the use of fibers having microencapsulated Phase Change Material (PCM) and fabrics made from them. Microcapsules are expensive, can rupture, need additional resinous agents for adhesion and can cause poor fabric flexibility and properties.

U.S. Pat. No. 6,793,856 discloses fibers made with polymeric material which are dipped in Phase Change Material (PCM) to produce Form Stable Phase Change Material (FSPCM).

U.S. Pat. No. 5,989,335 issued to Soroushian discloses using mechanical action to reduce the bonding between fibers so that the fibers can be dispersed in matrix. One disadvantage of using mechanical means to break the inter-fiber bonding is that once the mechanically dispersed fibers are placed in the mixture, hydrogen bonds can again form between the fibers and cause the fibers to recluster in the mix.

U.S. Pat. No. 7,320,770 discloses the use of only polymer and mono hydroxy alcohol, fatty acids and paraffin waxes to produce Form Stable Phase Change Material (FSPCM).

Further, many patents focus on non-exuding property of Form Stable Phase Change Material (FSPCM). For example, U.S. Pat. No. 5,520,103 and U.S. patent application Ser. No. 12/736,258 discloses non-exuding property of Form Stable Phase Change Material (FSPCM). But these patents do not have any reference to brittleness and low tensile strength of Form Stable Phase Change Material (FSPCM) below the transition temperature.

Again U.S. patent application Ser. No. 11/0786 and U.S. patent application Ser. No. 12/174,607 describes a complicated process for preparing Phase Change Material (PCM) and polymer blend for thermal management.

The polymer matrix chosen earlier to support the Phase Change Material (PCM) is more than 20% which reduces the available latent heat of the Phase Change Material (PCM). U.S. patent application Ser. No. 11/258,779 and U.S. patent application Ser. No. 12/736,258 discloses that the use of more than 60% Phase Change Material (PCM) decreases the mechanical strength of the composite.

EP Patent Application No. 07007327.5 describes fiber reinforced cement composite materials using chemically treated fibers with improved dispersibility.

Therefore there exists a need for a Reinforced Form Stable Phase Change Material (RFSPCM) which is non-toxic, flexible and has high latent heat and high tensile or tearing strength, both above and below the melting point of Phase Change Material (PCM). The stable composition of the present invention can easily be heated and cooled without changing the structure and composition and also without exuding its Phase Change Material (PCM). The present invention provides a Phase Change Material (PCM) product for providing stored heat that has improved safety and handle ability.

The novelty in the present invention is the reinforcement of polymer or Phase Change Material (PCM) matrix by mixing with chemically treated fiber, which gives the blend of a more stable form than so far obtainable and has high tensile or tear strength either above or below the melting point of the Phase Change Material (PCM).

BRIEF DESCRIPTION OF FIGURES

The features of the present invention, which are believed to be novel, are set forth with particularity in the appended claims. The invention may best be understood by reference to the following description, taken in conjunction with the accompanying drawings. These drawings and the associated description are provided to illustrate some embodiments of the invention, and not to limit the scope of the invention.

SUMMARY

Figure 1:
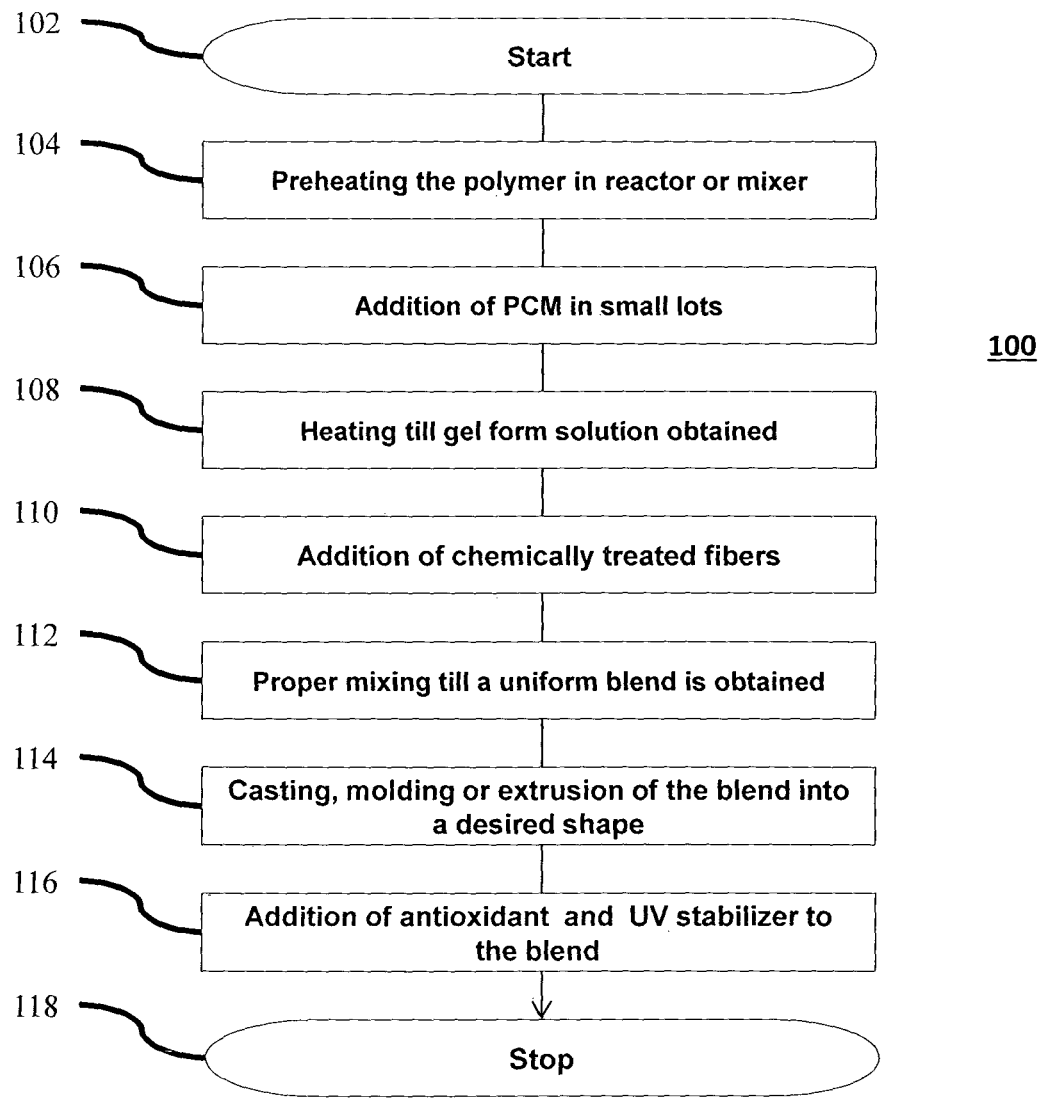
FIG. 1 shows a flow chart depicting a process for the preparation of a Reinforced Form Stable Phase Change Material (RFSPCM)

In an object of the present invention to provide a Reinforced Form Stable Phase Change Material (RFSPCM) and product thereof for thermal management.

Another object of the present invention is to provide a process for preparation of a Reinforced Form Stable Phase Change Material (RFSPCM)

Another object of the present invention is to provide a Reinforced Form Stable Phase Change Material (RFSPCM) and product thereof for thermal management, wherein the Reinforced Form Stable Phase Change Material (RFSPCM) obtained has high latent heat and moreover the blend does not show appreciable deviation from the transition temperature of the Phase Change Material (PCM) alone.

Yet another object of the present invention is to provide a Reinforced Form Stable Phase Change Material (RFSPCM) and product thereof for thermal management, wherein the end product obtained from the blend has high tensile and/or tear strength.

Yet another object of the present invention is to provide a Reinforced Form Stable Phase Change Material (RFSPCM) and product thereof for thermal management, wherein the product thickness is 1 mm or less.

Yet another object of the present invention is to provide a Reinforced. Form Stable Phase Change Material (RFSPCM) and product thereof for thermal management, wherein there is no seepage (exudation) of the Reinforced Form Stable Phase Change Material (RFSPCM) at or above the melting point of the Phase Change Material (PCM).

Yet another object of the present invention is to provide a Reinforced. Form Stable Phase Change Material (RFSPCM) and product thereof for thermal management, wherein the components of the blend are completely nontoxic.

Yet another object of the present invention is to provide a Reinforced Form Stable Phase Change Material (RFSPCM) and product thereof for thermal management, wherein the charging process of the PCM is done using warm water.

Yet another object of the present invention is to provide a Reinforced Form Stable Phase Change Material (RFSPCM) and product thereof for thermal management, wherein the PCM product stores heat, and has improved safety and handle ability.

A further object of the present invention is to provide a Reinforced Form Stable Phase Change Material (RFSPCM) and product thereof for thermal management, wherein the fiber used for reinforcement is chemically treated.

The Reinforced Form Stable Phase Change Material (RFSPCM) provided by the present invention comprises a Phase Change Material (PCM) whose weight percentage varies from 50% to 97% of the total weight. In addition the Reinforced Form Stable Phase Change Material (RFSPCM) also comprises a thermoplastic polymer whose weight varies from 2% to 50% of the total weight. Further the Reinforced Form Stable Phase Change Material (RFSPCM) also comprises chemically treated fiber whose weight varies from 0.1% to 10% of the total weight.

Moreover the Reinforced Form Stable Phase Change Material (RFSPCM) provided by the invention is nontoxic, flexible and has high tensile and tearing strength. Further the present invention is useful in various thermal energy storage applications especially where leakage needs to be avoided.

The invention further discloses a process for preparation of Reinforced Form Stable Phase Change Material (RFSPCM) and product thereof. This process of reinforcement by chemically treated fibers in polymer and Phase Change Material (PCM) matrix gives a unique and uniform blend of a stable form. This uniform blend remains in same form, even when the Reinforced Form Stable Phase Change Material (RFSPCM) is in liquid state.

DETAILED DESCRIPTION OF THE INVENTION

Before describing the invention in detail, it should be observed that the present invention utilizes apparatus components and method steps related to preparation of a Reinforced. Form Stable Phase Change Material (RFSPCM). Accordingly the invention has been represented where appropriate by conventional symbols in the drawings, showing only specific details that are pertinent for an understanding of the present invention so as not to obscure the disclosure with details that will be readily apparent to those with ordinary skill in the art having the benefit of the description herein.

While the specification concludes with the claims defining the features of the invention that are regarded as novel, it is believed that the invention will be better understood from a consideration of the following description in conjunction with the figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural, functional, and compositional details disclosed herein are not to be interpreted as limiting, but merely as a basis for the claims and as a representative basis for teaching one skilled in the art to variously employ the present invention in virtually any domain. Further, the terms and phrases used herein are not intended to be limiting but rather to provide an understandable description of the invention.

The terms "a" or "an", as used herein, are defined as one or more than one. The term "another", as used herein, is defined as at least a second or more. The terms "including" and/or "having" as used herein, are defined as comprising (i.e. open transition).

The foregoing objects of the present invention are accomplished and the problems and shortcomings associated with the prior art, techniques and approaches are overcome by the present invention, as described below in the preferred embodiments.

The present invention discloses a Reinforced Form Stable Phase Change Material (RFSPCM) formed by the combination of a Phase Change Material (PCM), a thermoplastic material, and chemically treated fiber wherein all the three constituents are non-toxic. The Phase Change Material (PCM) comprises 50% to 97% by weight of the Reinforced Form Stable Phase Change Material (RFSPCM), the thermoplastic polymer comprises 2% to 50% by weight of the Reinforced Form Stable Phase Change Material (RFSPCM), and the chemically treated fiber comprises 0.1% to 10% by weight of the Reinforced Form Stable Phase Change Material (RFSPCM).

The Phase Change Material (PCM) is selected the group comprising organic chemicals, inorganic chemicals, eutectic chemicals preferably organic, and eutectic chemicals and a mixture of these chemicals.

The thermoplastic polymer comprises one or more polymer material selected from the group comprising high mass polymer, hydrocarbon polymer, low mass polymer, other thermoplastic polymers or a mixture of the various polymers. The primary function of the thermoplastic polymer is to acts as a shape stabilizer.

Moreover the chemically treated fiber comprising the Reinforced Form Stable Phase Change Material (RFSPCM) is a fiber treated with chemicals in order to facilitate positive interaction between fiber and the thermoplastic polymer matrix, thus enabling increased polar bonding. The increased polar bonding facilitates increased adhesion and increased mechanical strength to the Reinforced Form Stable Phase Change Material (RFSPCM). The chemically treated fiber is selected from the group comprising of polypropylene, acrylic, viscose, nylon, glass, cellulose or any other material inert to the Phase Change Material (PCM) used. Moreover the fiber selected has a higher melting point than the melting point of the Phase Change Material (PCM). The chemicals used for treatment of the chemically treated fiber include, but are not limited to mild alkalies, dilute acids, maleic anhydride grafting and surface reaction with chemicals. Also a thermally conductive material is added to the Reinforced Form Stable Phase Change Material (RFSPCM) so as to improve its thermal conductivity.

The Reinforced Form Stable Phase Change Material (RFSPCM) obtained from the above composition has high shape stability even above and below its melting point. This is due to the addition of thermoplastic polymer and chemically treated fibers. Also it has a high latent heat storage capacity.

The Reinforced Form Stable Phase Change Material (RFSPCM) can be cast and molded into a plurality of shapes and sizes, the shape being selected from any one of a pellet form, cubical form, spherical form, sheet form or any other form according to desired application. Sheets even up to a minimum thickness of 0.1 mm are obtainable from it. This Reinforced Form. Stable Phase Change Material (RFSPCM)

in its various shapes, sizes and forms can be used in jackets, apparel, thermal seat cushions, table ware items, hot plates, food warmer, medical wrap, cooling lithium ion batteries, tea coasters or covers for tea cups, seat covers in cars, dining mats, liner of helmet, cold chain transportations, and any heating and cooling applications where leakage is to be avoided.

Moving on there is shown in FIG. 1, a flowchart depicting a process 100 for preparing Reinforced Form Stable Phase Change Material (RFSPCM). For the purpose of this description, the process 100 is explained in conjunction with the RFSPCM described above and its various components. However, it will be readily apparent to those ordinarily skilled in the art that the process 100 can also be applied, without deviating from the scope of the invention, for any other RFSPCM. Moreover, the disclosure is not limited to the order in which the steps are listed in the process 100. In addition, the process 100 can contain a greater or fewer numbers of steps than those shown in FIG. 1.

According to the present invention, the process 100 is initiated at step 102. At step 104, 2%-50% by weight of thermo plastic polymer is preheated in a mixer. The mixer includes specially designed blades which cause uniform mixing of the ingredients such as sigma mixer or any other mixer used in plastics and rubber processing. The temperature inside the mixer is maintained at a processing temperature of about 30° C.-100° C. above the melting point of the Phase Change Material (PCM), which is to be added subsequently. This is followed by step 104 involving the addition of a 50%-97% by weight of Phase Change Material (PCM). Small quantities of Phase Change Material (PCM) are added in batches to allow swelling of the polymer. Moreover, less amount of Phase Change Material (PCM) allows better shearing in the initial stages.

The mixer runs to cause shearing between the polymer particles due to the movement of blades. This ensures uniform composition throughout the mixture.

After the complete addition of Phase Change Material (PCM), at step 108 the mixture is heated till the polymer for example, Styrene Ethylene Butadiene Styrene (SEBS) appears swollen and suspended in the solution to form a gel like substance. Also the mixing is continued for sufficient time, to allow complete mixing of the two ingredients.

After complete mixing of the two ingredients, at step 110, addition of fibers to the solution is carried out. The fibers are added such that their total weight percentage in the mixture lies between 0.1-10%. In a particular embodiment of the present invention, fibers used are chemically treated acrylic, viscose, nylon, polypropylene, glass, cellulose, or any other inert fiber. The length of fiber ranges between 0.1 mm to 100 mm, preferably from 1 mm to 50 mm and more preferably from 3 mm to 15 mm.

The temperature of mixer during the entire process is maintained in the temperature range of ±10° C. of the processing temperature. Thus the temperature during the entire process lies between 20-110° C. above the melting point of the Phase Change Material (PCM).

This is followed by step 112 wherein the mixture is allowed to run in the mixer till all the polymer particles gets dispersed in the blend and the mixture becomes uniform. The blades of the mixer facilitate the proper mixing of the fibers. Finally a blend containing polymer and Phase Change Material (PCM) reinforced with fibers is obtained as a uniform blend. For an 8 kg batch, the mixing is done for a period of 1-2 hours.

Thereafter at step 114, molding and casting of the mixture into various shapes and sizes such as sheet form, pellets, granules, beads, cubical form, spherical shape or any other, according to desired application is done. The mixture can also be molded into products having a thickness of 1 mm or less.

The pellets, granules, beads and small objects of size 1-10 mm, formed from Reinforced Form Stable Phase Change Material (RFSPCM) can also be coated with some non-sticky film forming substances to prevent agglomeration.

Moreover to prevent the degradation of the Polymer, in step 116 antioxidants and UV stabilizer are added. These additives prevent the degradation of the polymer Phase Change Material (PCM) blend over the period of time, as is known to person skilled in the art. Thereafter the process 100 is terminated at step 118.

Figure 2:
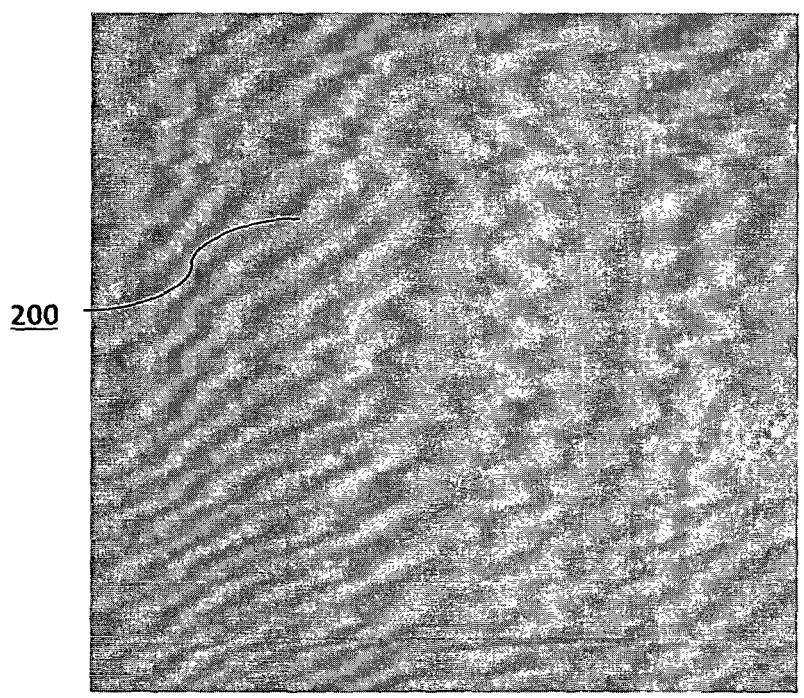
FIG. 2 shows Reinforced Form Stable Phase Change Material (RFSPCM) at below its melting point i.e. Reinforced Form Stable Phase Change Material (RFSPCM) in solid state.
Figure 3:
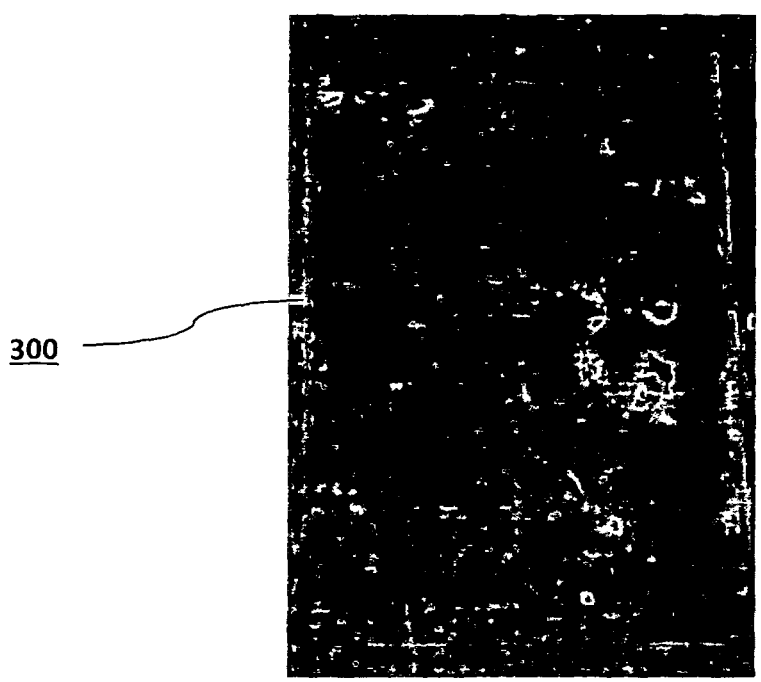
FIG. 3 shows Reinforced Form Stable Phase Change Material (RFSPCM) at a temperature above its melting point.

The Reinforced. Form Stable Phase Change Material (RFSPCM) obtained as such has non exuding property, both above and below the transition temperature of the Phase Change Material (PCM) used, as shown in FIG. 2 and FIG. 3. However, the Reinforced Form Stable Phase Change Material (RFSPCM) retains its shape till its temperature reaches 50° C. above the melting point of the PCM used; above which it becomes a gelatinous mass. At the temperature below the melting point of the Phase Change Material (PCM), the Reinforced Form Stable Phase Change Material (RFSPCM) loses its brittleness. Also it has a high tensile/tear strength due to reinforcement by the chemically treated fibers. Moreover it is non-toxic and has pretty high flexibility.

In an embodiment other additives may be added one by one or all at once. For example clay, other fillers, antioxidant and treated fibers, are premixed and added at such a rate that the temperature of the mix in sigma mixture does not drop substantially.

In another embodiment, the Reinforced Form Stable Phase Change Material (RFSPCM) is made thermally conductive by the addition of a thermally conductive material to the Phase Change Material (PCM).

In yet another embodiment the Phase Change Material (PCM) is first melted inside the mixer and the SEBS is then added in a single batch and continuously mixed.

In a further embodiment of the present invention, one or more polymers selected from the group comprises of high mass polymer, hydrocarbon polymers (apolar) such as polyisobutylenes or polyisobutenes (PIB), ethylene, propylene or higher olefine polymers; ethylene, propylene or higher olefine copolymers and their derivatives; copolymers based on combined dienes (hydrogenated polybutadiene, hydrogenated butadiene-styrene, hydrogenated ethylene-butadiene and hydrogenated isoprene-styrene copolymers) linear, tri-block (SEBS 6151 from Taipol) or radial; or other styrene based polymers, ester polymers (polar) such as alkyl polyacrylates; alkyl polymethacrylates; maleates and fumarates; itaconates, mixed ester hydrocarbon polymers, such as olefin copolymers associated with esters (OCP-esters); alkyl-styrene methacrylate or acrylate; polyolefin acrylate or methacrylate copolymers. Persons skilled in the art are aware that Phase Change Material (PCM) and polymer pair must be inert to each other but must have affinity for each other to form a blend. Also the polymer can be in powder form or granular form.

In an embodiment of the present invention, the fibers can be made from polar polymers or otherwise grafted with reactive monomers post the fiber forming step. In the former case reactive materials such as maleic anhydride grafted polyolefins and other polymers may be used. In an embodiment, it can be spun into fibers and used. Other reactive polymers include Hydrocarbon polymers (apolar) such as polyisobutylenes or polyisobutenes (PIB), ethylene, propylene or higher carbon polymers; ethylene, propylene or higher carbon copolymers and their derivatives; copolymers based on combined dienes (hydrogenated polybutadiene, hydrogenated butadiene-styrene, hydrogenated ethylene-butadiene and hydrogenated isoprene-styrene copolymers) linear, tri-block (SEBS 6151 from Taipol) or radial; or other styrene based polymers, Ester polymers (polar) such as alkyl polyacrylates; alkyl polymethacrylates; maleates and fumarates; itaconates, mixed ester hydrocarbon polymers, such as olefin copolymers associated with esters (OCP-esters); alkyl-styrene methacrylate or acrylate; polyolefin acrylate or methacrylate copolymers.

In case of fiber treatment, for example PET or acrylic fibers can be treated with NaOH as is explained in example 3 and example 4 in more detail. Other possibilities exist with nylon, wool, cellulosics, and cotton. This reinforcement with treated fibers results in positive interaction between fibers and polymer matrix to give additional polar bonding and hence increased adhesion and mechanical strength.

Surface treatments of the fibers, although having a negative economic impact, are potentially able to overcome the problem of incompatibility between the fibers and the polymer matrix. Chemical treatments can increase the interfacial adhesion between the fiber and polymer matrix, and decrease the water absorption of fibers. Therefore, chemical treatments can be considered in modifying the properties of natural fibers. Some compounds, such as sodium hydroxide, silane, acetic acid, acrylic acid, maleated coupling agents, isocyanates, potassium permanganate, peroxide, etc are known to promote adhesion by chemically coupling the adhesive to the material. Fiber modification methods have different efficacy in causing adhesion between the matrix and the fiber. Chemical treatments have achieved various levels of success in improving fiber strength, fiber fitness and fiber-matrix adhesion in fiber reinforced composites.

The chemically treated fibers with improved dispersibility improve the fiber distribution and reinforcing efficiency, which in turn improves key physical and mechanical properties of the material such as the modulus of rupture, tensile strength, toughness and surface finish.

Use of poorly dispersed fiber in fiber matrix composite materials usually results in uneven fiber distribution and lower reinforcing efficiency, which in turn leads to lower strength, toughness, and strain in the final product. Thus, in order to achieve a certain level of reinforcement, substantially more fibers are needed to compensate for the uneven fiber distribution in the matrix, which in turn significantly increases the material cost. With the improved fiber reinforcing efficiency, less dosage of fiber is needed to achieve the required physical and mechanical properties.

Different fibers require different chemical treatment to improve the efficacy of Reinforced Form Stable Phase Change Material (RFSPCM) prior to use in Form Stable matrix. Chemical treatment includes alkaline treatment, silane treatment, acetylation, benzoylation treatment, acrylation and acrylonitrile grafting, maleated coupling agents, permanganate treatment, peroxide treatment, isocyanate treatment.

The Reinforced Form Stable Phase Change Material (RFSPCM) can be produced by conventional mixing processes as practiced in the plastics & rubber mixing industries. Such processes include use of sigma mixer, heated high speed mixers, single screw and multi-screw extruders, and batch mixer (heated as appropriate for different PCMs) as is known to the persons skilled in the art.

Fibers equivalent/similar to chemically treated fibers can also be produced by various other processes. For example direct spinning of functionalized polymers such as Maleic anhydride grafted polyethylenes or polypropylene, other modifiers such Glycidyl methacrylate, can also be used in place of the chemically treated fibers.

Cellulose reinforced fiber materials have drawbacks such as lower reinforcing efficiency, lower strength, and lower toughness due to poor fiber dispersion and uneven fiber distribution in the matrix. These drawbacks are due to hydrophilic nature of cellulose fibers. Cellulose fibers have multiple hydroxyl and carboxyl functional groups. These functional groups have strong tendency to form hydrogen intra-fiber and inter fiber hydrogen bonds. Hydrogen bonding between fibers often results in the formation of fiber clumps and clusters. The fiber clusters are difficult to disperse in dry and semidry processes such as extrusion, moulding and casting. The hydrogen bonding between hydroxyl group promotes fiber curling or forming fiber balls, which also results in low fiber reinforcement efficiency.

The Reinforced Form Stable Phase Change Material (RFSPCM) obtained has high latent heat. Moreover the blend does not show appreciable deviation from the transition temperature of the Phase Change Material (PCM) alone.

Dispersant e.g. polyamine compound, cationic quaternaryamine compounds including alkyltrimethyl quarternary ammonium salts, dialkyl chlorides, ethoxylated quarternary ammonium salts, surfactants, alkylalkoxysilane, alkoxylsilane and halide organosilanes can be used but are not essential for fiber dispersion. Dispersants comprise from about 0.001% to 5%. Any additives add extra properties to Phase Change Material (PCM) but also compromise the latent heat capacity of the Phase Change Material (PCM).

Preferred embodiments of present invention provide a Phase Change Material (PCM) incorporating reinforcing fibers, wherein fibers substantially reduce the exudation from Phase Change Material (PCM) composite.

Chemically treated fibers are treated with one or more chemical compounds e.g. dispersants that inhibit the fibers from forming inter-fiber bonds. These dispersants bind the hydroxyl functional groups on the fiber surface.

There is a need for fiber reinforced material having improved fiber distribution and reinforcing efficiency. Chemical treatment improves reinforcing efficiency although that is not primary aim of this invention. It also provides subsidiary benefit of using chemically treated fibers.

For better compatibility, the fiber needs to have hydrophilic group while Phase Change Material (PCM) is hydrophilic and fiber needs to be hydrophobic while Phase Change Material (PCM) is hydrophobic.

In another embodiment of the present invention, preparation of Reinforced Form Stable Phase Change Material include paraffin, organic substance, inorganic substance, fatty acid, wax, and eutectic mixture. A selection of which is being commercially produced by Pluss Polymers, New Delhi under the trade name savE® frost, minus 23 etc.

The foregoing descriptions of specific embodiments of the present invention have been presented for purposes of illustration and description only. They are not intended to be exhaustive or to limit the scope of present invention to the precise forms disclosed, and obviously many modifications and variations are possible in the light of the above teaching.

EXAMPLE 1

A procedure for preparing Reinforced Form Stable Phase Change Material (RFSPCM) is illustrated here. In this procedure 150 g of Reinforced Form Stable 65 Phase Change Material (RFSPCM) was made with 8 g of Styrene Ethylene Butadiene Styrene (SEBS) and 140 g stearic acid. Initially stearic acid was added to a 1 liter stainless steel cylindrical flat bottomed container. The container was placed on a hot plate stearic acid maintained at a temperature of 75-80° C. To this 8 g of Styrene Ethylene Butadiene Styrene (SEBS) was added with continuous stirring which made the mixture seem like gel globules suspended in a liquid. Then the mixture was constantly stirred to make it uniform. On increasing the temperature up to 105-110°, the Styrene Ethylene Butadiene Styrene (SEBS) globules started homogenizing and getting mixed with stearic acid. After around 45 min constant stirring at this temperature, the mixture changed to a uniform sticky gel. After this 1.5 g chemically treated fiber PET (Polyethylene Terephthalate) fiber was added and mixed uniformly. Then it was cooled and the Reinforced Form Stable PCM was obtained. When solid cube 10×10×10 mm$^3$ RFS 65 PCM as made in this example was kept in convection oven, it started deforming at 140° C.

EXAMPLE 2

Reinforced Form Stable 21 Phase Change Material (RFSPCM) is made by the process explained above using 8% of Styrene Ethylene Butadiene Styrene (SEBS). One sample was made without fiber, second with PP fiber and third with Polyester fiber. 1×1×1 cm3 cubes were made with each of Form Stable Phase Change Material (FSPCM) FS PCM sample. Then these cubes were placed in hot air oven and deformation (flow) temperature was noted.

Flow temp of Reinforced Form Stable 21 Phase Change Material (RFSPCM) with PP fiber—37° C.

Flow temp of Reinforced Form Stable 21 Phase Change Material (RFSPCM) with Polyester fiber—38° C.

Flow temperature of Form Stable 21 Phase Change Material (FSPCM) is 33° C.

We observed that Phase Change Material (PCM) cube with fiber started to deform at higher temperature as compared to Phase Change Material (PCM) cube without fiber.

EXAMPLE 3

Reinforced Form Stable 32 Phase Change Material (RFSPCM) was prepared with the process as explained in the description. PP and PET fibers were treated with 4% NaOH solution. Reinforced. Form Stable 32 Phase Change Material (RFSPCM) were reinforced with treated and untreated PP and PET fiber. Then cubes of 15×15×15 mm$^3$ were made. These cubes were put inside hot air oven at set temperature. The cubes were observed after 10 min to check whether the material deforms or starts to flow at that temperature. If it does not deform or starts to flow then the temperature of hot air oven was further increased and observation was taken after 10 min. The following results were obtained:

| FS 32 reinforced with | Flow temperature (° C.) |
| --- | --- |
| PP fiber | 80 |
| 4% NaOH treated PP fiber | 90 |
| PET fiber | 92 |
| 4% NaOH treated PET fiber | 95 |

The above results illustrate that Reinforced Form. Stable Phase Change Material (RFSPCM) reinforced with chemically treated fiber has more stability than Reinforced Form Stable Phase Change Material (RFSPCM) reinforced with untreated fiber.

EXAMPLE 4

Addition of aqueous NaOH to natural fiber promotes the ionization of the hydroxyl group to alkoxide:

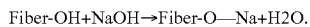

Fiber-OH+NaOH→Fiber-O—Na+H2O.

4% NaOH treatment to Sisal fiber at room temperature gave up to 30% increase in tensile strength.

Alkaline treatment has two effects on the fiber. It increases surface roughness resulting in better mechanical interlocking. Secondly, it increases the amount of cellulose exposed on the fiber surface, resulting in increasing the number of reaction sites.

4% NaOH concentration is better than 10% NaOH concentration. This is because higher alkali concentration, excess delignification of natural fiber occurs resulting in a weaker or damaged fiber.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A Reinforced Form Stable Phase Change Material (RFSPCM) comprising:
   i) 50% to 97% by weight of a Phase Change Material (PCM);
   ii) 2.9% to 40% by weight of a thermoplastic polymer, wherein the thermoplastic polymer is Styrene Ethylene Butadiene Styrene (SEBS) acting as a shape stabilizer; and
   iii) 0.1 to 10% by weight of a chemically treated fiber;
      wherein the treatment of chemically treated fiber is selected from the group consisting of alkaline treatment, silane treatment, acetylation, benzoylation treatment, acrylation grafting, acrylonitrile grafting, maleated coupling agents, permanganate treatment, peroxide treatment and isocyanate treatment;
      wherein length of the fiber is in the range of 3 mm to 15 mm; and
      wherein the shape of the Reinforced Form Stable Phase Change Material is retained until the temperature reaches 50° C. above the melting point of the Phase Change Material (PCM).

2. The Reinforced Form Stable Phase Change Material (RFSPCM) according to claim 1, wherein all the components of the Reinforced Form Stable Phase Change Material (RFSPCM) are non-toxic.

3. The Reinforced Form Stable Phase Change Material (RFSPCM) according to claim 1 further comprising a thermally conductive material.

4. The Reinforced Form Stable Phase Change Material (RFSPCM) according to claim 3, wherein the Reinforced Form Stable Phase Change Material is thermally conductive.

5. The Reinforced Form Stable Phase Change Material (RFSPCM) according to claim 1, wherein chemical treatment of the chemically treated fiber results in interaction between fiber and the thermoplastic polymer matrix to enable a polar bonding, thereby providing increased adhesion and increased mechanical strength to the Reinforced Form Stable Phase Change Material (RFSPCM).

6. The Reinforced Form Stable Phase Change Material (RFSPCM) according to claim 1, further comprising an additional thermoplastic polymer selected from the group consisting of polyisobutylene (PIB), ethylene, propylene, olefin polymers, olefin copolymers, hydrogenated polybutadiene, hydrogenated butadiene-styrene, hydrogenated ethylene-butadiene, hydrogenated isoprene-styrene copolymers, alkyl polyacrylates, alkyl polymethacrylates, maleates, fumarates, itaconates, olefin copolymers associated with esters (OCP-esters), alkyl-styrene methacrylate, acrylate, polyolefin acrylate, methacrylate copolymers and combinations thereof.

7. The Reinforced Form Stable Phase Change Material (RFSPCM) according to claim 1, wherein the chemically treated fiber is selected from the group consisting of polypropylene, acrylic, viscose, nylon, glass and cellulose, further wherein the fiber selected has a higher melting point than the melting point of the Phase Change Material (PCM).

8. The Reinforced Form Stable Phase Change Material (RFSPCM) according to claim 1, wherein the Reinforced Form Stable Phase Change material is molded and cast into a plurality of shapes and sizes, the shape being selected from the group consisting of sheet form, pellets form, cubical form and spherical form.

9. The Reinforced Form Stable Phase Change Material (RFSPCM) according to claim 8, wherein the sheet form has a minimum thickness of 0.1 mm.

10. The Reinforced Form Stable Phase Change Material (RFSPCM) according to claim 1, wherein the Reinforced Form Stable Phase Change Material is used in apparel, thermal seat cushions, tableware items, hot plates, food warmer, medical wrap and cooling lithium ion batteries.

11. The Reinforced Form Stable Phase Change Material (RFSPCM) according to claim 1, wherein the Phase Change Material (PCM) is selected from the group consisting of organic chemicals, eutectic chemicals and mixtures thereof.

\* \* \* \* \*